(12) United States Patent
Roban

(10) Patent No.: US 8,653,364 B2
(45) Date of Patent: Feb. 18, 2014

(54) FRAME FOR GRAPHIC IMAGES

(76) Inventor: Brian Joseph Roban, Woodbury, MN (US)

( * ) Notice: Subject to any disclaimer, the term of this patent is extended or adjusted under 35 U.S.C. 154(b) by 202 days.

(21) Appl. No.: 13/282,871

(22) Filed: Oct. 27, 2011

(65) Prior Publication Data

US 2012/0145430 A1    Jun. 14, 2012

Related U.S. Application Data

(60) Provisional application No. 61/421,708, filed on Dec. 10, 2010.

(51) Int. Cl.
*H02G 3/14* (2006.01)

(52) U.S. Cl.
USPC ............... 174/66; 174/67; 220/241; 220/242

(58) Field of Classification Search
USPC ............... 174/66, 67; 220/241, 242; 439/136, 439/142, 147, 135, 149; D8/353; D13/177
See application file for complete search history.

(56) References Cited

U.S. PATENT DOCUMENTS

| | | | |
|---|---|---|---|
| 3,843,166 A | | 10/1974 | Barone |
| 3,845,252 A | | 10/1974 | Wooters |
| 3,859,454 A | | 1/1975 | Mann |
| 4,425,725 A | * | 1/1984 | Moustakas et al. ............. 174/66 |
| 4,780,573 A | * | 10/1988 | Own ............................... 174/66 |
| 4,800,239 A | * | 1/1989 | Hill ................................. 174/66 |
| 5,045,640 A | * | 9/1991 | Riceman ......................... 174/67 |
| 5,389,740 A | * | 2/1995 | Austin ............................ 174/67 |
| 5,675,125 A | * | 10/1997 | Hollinger ....................... 174/66 |
| 5,735,708 A | * | 4/1998 | Arnett et al. ................... 174/66 |
| 5,955,702 A | * | 9/1999 | Grossman et al. ............. 174/66 |
| 6,026,605 A | * | 2/2000 | Tippett ........................... 174/66 |
| 6,593,530 B2 | * | 7/2003 | Hunt ............................... 174/66 |
| 6,916,989 B2 | * | 7/2005 | Broussard, Jr. ................ 174/66 |
| 7,067,737 B2 | | 6/2006 | Mallen |
| 7,820,910 B1 | * | 10/2010 | Cleghorn et al. .............. 174/66 |

* cited by examiner

*Primary Examiner* — Angel R Estrada
(74) *Attorney, Agent, or Firm* — Nikolai & Mersereau, P.A.; Thomas J. Nikolai

(57) ABSTRACT

When a wall mounted telephone is removed from its mounting plate, the telephone wall plate and jack remains and this is unsightly. The frame of the present invention allows the telephone plate to remain, but be obscured. The frame assembly includes a removable, transparent cover that releasably attaches to a base member and a photograph, a drawing, other graphic decorative material or written indicia is sandwiched therebetween.

16 Claims, 3 Drawing Sheets

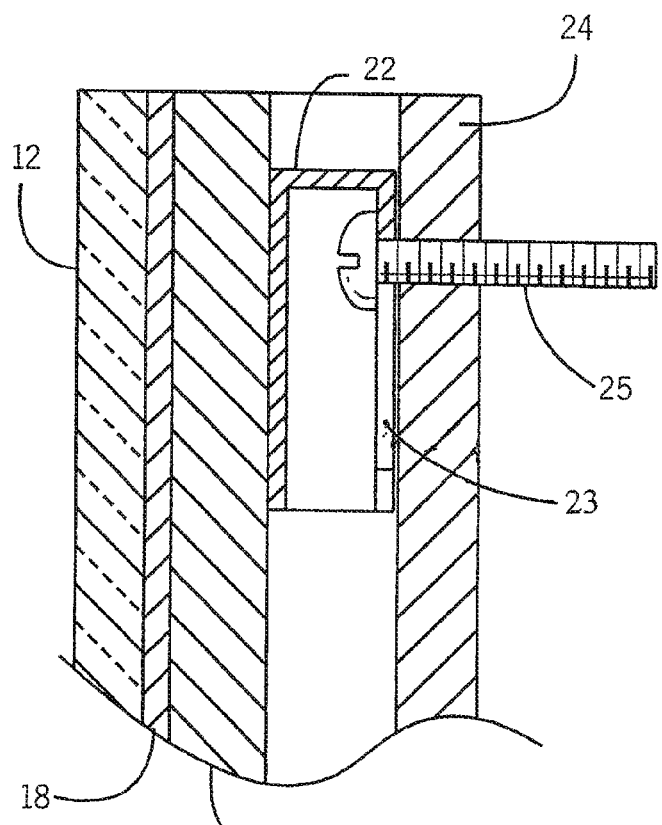
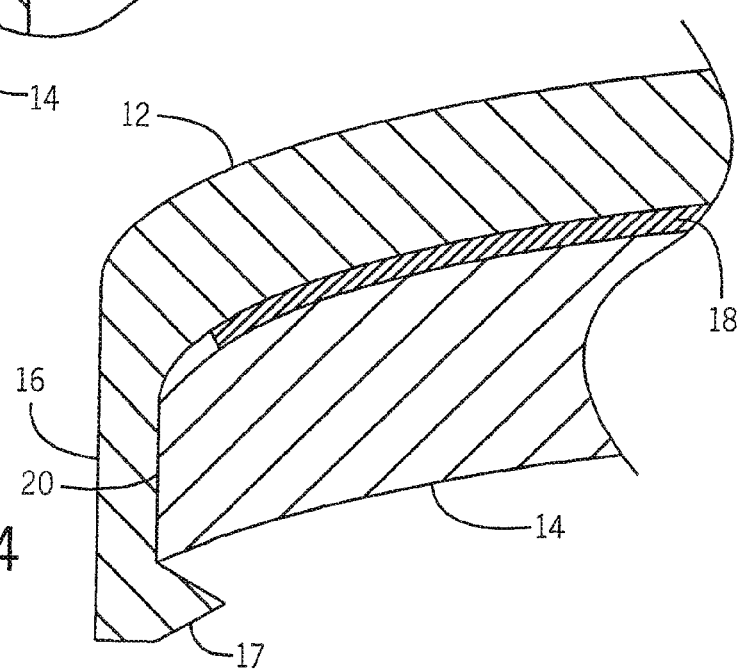
FIG. 3
FIG. 4

FRAME FOR GRAPHIC IMAGES

CROSS REFERENCE TO RELATED APPLICATION

The present application is a non-provisional filing based upon Provisional Application No. 61/421,708, filed Dec. 10, 2010, and the contents of which are hereby incorporated by reference as if fully set forth herein.

FIELD OF THE INVENTION

This invention relates generally to decorative frames for graphic works and more particularly to a frame device for concealing unattractive electrical wall plates.

DISCUSSION OF THE PRIOR ART

With the advent of the cell phone, more and more homeowners and business establishments are dispensing with their landlines as a cost saving measure. Many such landline phones have been wall mounted where a rectangular plate having a conventional phone jack is affixed by screws to a wall surface and a telephone base unit is suspended from a pair of studs that project out from the surface of the wall plate. When the wall phone is no longer used, the wall plate is often left in place to obviate the need to patch or otherwise repair a hole in the wall surface where the phone line exits the interior of the wall to connect to the phone jack on the plate.

While it is recognized that the conventional phone electrical wall plate is not particularly attractive, a need exists for a way to conceal the wall plate in a way that enhances a room décor. The present invention fulfills this need.

SUMMARY OF THE INVENTION

The present invention comprises a decorative covering assembly for hiding an electrical outlet plate on a room wall and comprises a generally rectangular base member having a convex front surface and a concave rear surface along with a correspondingly shape transparent cover member having an arcuate curvature conforming to the convex front surface of the base member. Projecting from the concave rear surface of the base member is a mounting bracket for suspending the assembly from a bolt or a stud of the electrical outlet plate with which it is to be used and designed such that the electrical outlet plate remains completely hidden. Viewable through the transparent cover is a replaceable decorative sheet, such as a photograph, wallpaper pattern, event calendar or any other alphanumeric or graphic images.

DESCRIPTION OF THE DRAWINGS

The foregoing features, objects and advantages of the invention will become apparent to those skilled in the art from the following detailed description of a preferred embodiment, especially when considered in conjunction with the accompanying drawings in which like numerals in the several views refer to corresponding parts.

FIG. 3 is a cross-sectional view taken on line 3-3 of FIG. 1; and

FIG. 4 is a cross-sectional view taken on line 4-4 of FIG. 1.

DESCRIPTION OF THE PREFERRED EMBODIMENTS

Figure 1:
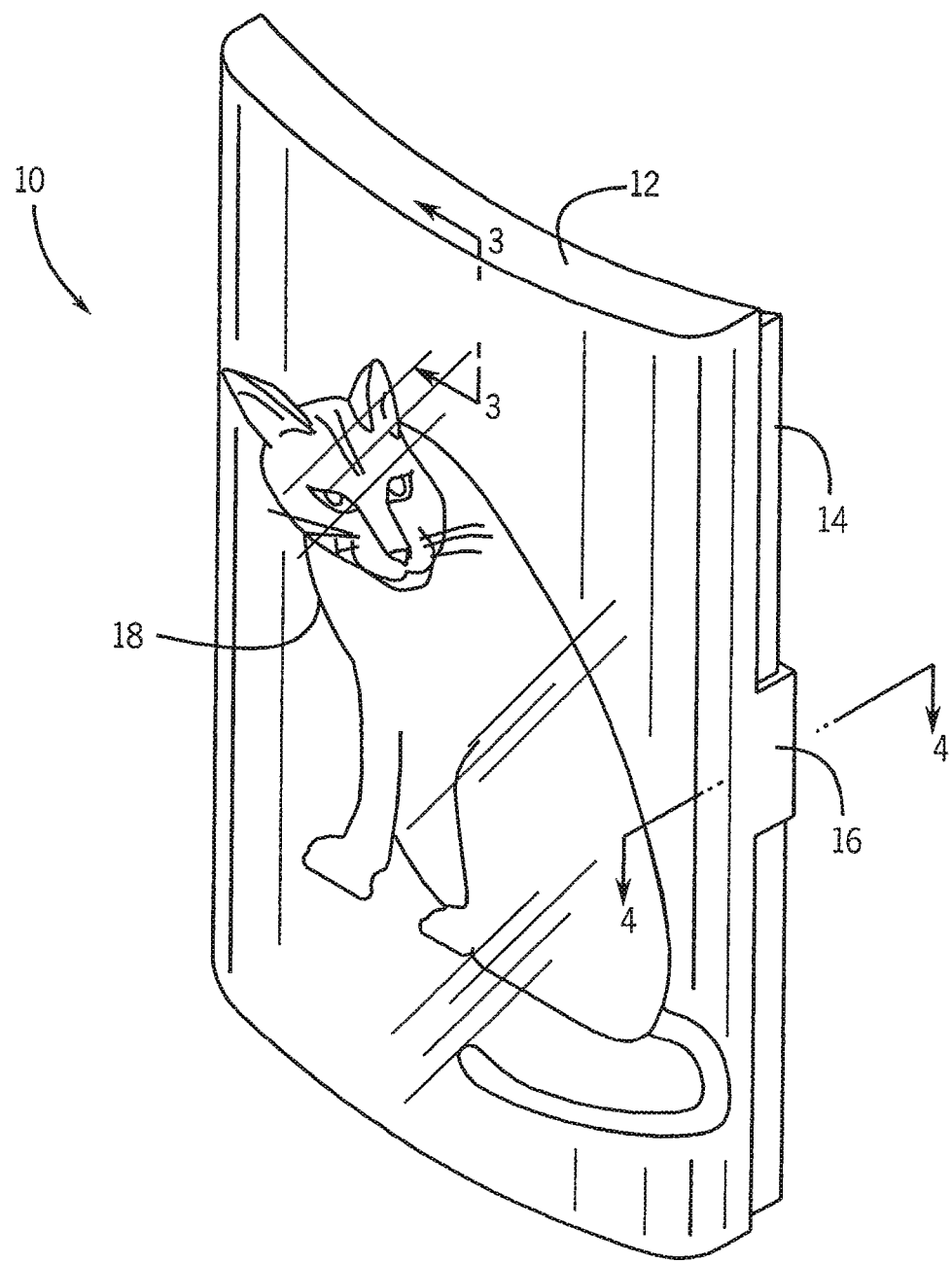
FIG. 1 is a perspective view of the invention.

This description of the preferred embodiments is intended to be read in connection with the accompanying drawings, which are to be considered part of the entire written description of this invention. In the description, relative terms such as "lower", "upper", "horizontal", "vertical", "above", "below", "up", "down", "top" and "bottom" as well as derivatives thereof (e.g., "horizontally", "downwardly", inwardly, "upwardly", etc.) should be construed to refer to the orientation as then described or as shown in the drawings under discussion. These relative terms are for convenience of description and do not require that the apparatus be constructed or operated in a particular orientation. Terms such as "connected", "connecting", "attached", "attaching", "join" and "joining" are used interchangeably and refer to one structure or surface being secured to another structure or surface or integrally fabricated in one piece, unless expressively described otherwise.

Referring to FIG. 1 the decorative frame comprising the present invention is referred to generally by numeral 10 and includes a transparent cover 12 that removably connects to a base member 14 by means of resilient clasps 16 integrally formed with the cover 12 on opposed side edges thereof. The cover 12 is preferably fabricated from a transparent plastic, such as methyl methacrylate. The base member 14 is preferably an opaque plastic formed in an injection molding operation.

As illustrated in FIG. 1, there is disposed between the cover 12 and the base member 14 a decorative substrate 18 which may comprise any one of a number of decorative media including, but not limited to, a photograph, a piece of wallpaper matching the pattern on a wall surrounding an area on which the frame of FIG. 1 is affixed, written information such as emergency phone numbers, an instruction to babysitters or any other pictorial or alphanumeric indicia desired. The cover, being transparent, allows viewing of the substrate that is sandwiched between the cover 12 and the base member 14.

Figure 2:
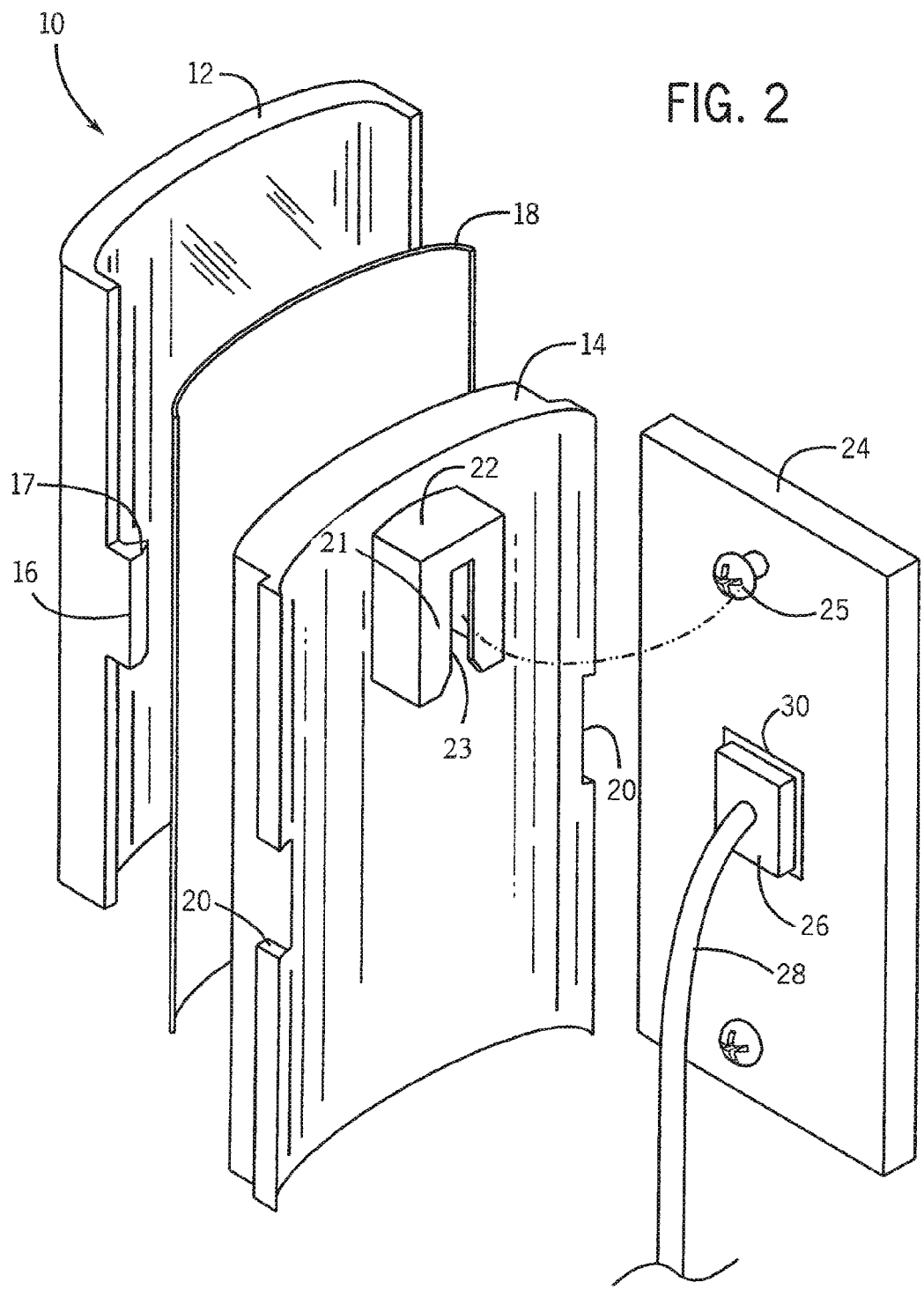
FIG. 2 is an exploded perspective view thereof.

Referring next to FIG. 2, the exploded view reveals that the transparent cover 12 is generally rectangular in its plan view but exhibits a convex outer surface and a concave inner surface. Likewise, the base member 14 has an arcuate cross section conforming in its curvature to that of the cover 12. The base member 14 includes notches, as at 20, that are adapted to be aligned with the clasp 16 on the transparent cover 12 and when the cover 12 and the base 14 are squeezed together, the barb 17 on the clasp 16 snaps in place to grip and hold the cover to the base member.

With continued reference to FIG. 2, integrally molded on the concave rear surface is a protuberance in the form of a hollow, generally rectangular, parallelepiped shaped mount 22 that has an open bottom and a longitudinally extending slot 23 formed through the thickness dimension of a rear surface 21 thereof. The slot 23 is aligned with a longitudinal center line of the assembly when the cover 12 is secured to the base member 14.

Also illustrated in FIG. 2 is a telephone wall plate 24 which is conventionally formed from metal and which includes a screw or a stud 25 extending outwardly therefrom on which the base unit of a wall mounted telephone is typically suspended. The telephone base unit cradles a telephone handset when not in use. The wall plate 24 includes a jack or a socket 30 designed to accommodate a phone plug 26 having contacts (not shown) that mate with contacts in the jack 30. Extending from the phone plug 26 is a short length of multi conductor cord 28 that has a connector (not shown) that is adapted to mate with a telephone base unit in a manner well known to those skilled in the art.

Referring to the cross sectional view of FIG. 3, it can be seen how the frame assembly of the present invention can be suspended from the screw or stud 25 forming a part of the telephone wall plate assembly 24. The screw or stud 25 extends outward slightly from the exposed face surface of the plate 24 allowing the mount 22 to slip over the exposed portion of the screw or stud and because the head on the screw or stud 25 is of a larger diameter than the width of the slot 23, the frame assembly including the cover 12, the decorative substrate 18 and the base member 14 are vertically and securely suspended in covering relation to the telephone wall plate 24. In this arrangement, the plug 26 and the cord 28 have been removed from the jack 30. Because of the manner in which the base member 14 and cover 12 are curved, the side edges of the base member 14 can contact the wall surrounding the plate 24 to thereby completely obscure the edge surfaces of the telephone wall plate 24.

The cross sectional view of FIG. 4 is provided to show the manner in which the cover 12 fits onto the base member 14 with the substrate 18 sandwiched therebetween. The barb 17 on the clasp 16 is sufficiently flexible to deflect without breaking as the cover is assembled onto the base unit or removed therefrom.

While the present invention has been shown and described in connection with a wall mount telephone plate, those skilled in the art can appreciate that the frame arrangement of the present invention may just as well be used with electrical fittings on a wall, such as an AC outlet and on/off switch. Hence, the use of the term "electric outlet plate" is intended to include not only wall mount telephone plates, but also cover plates for electrical wall outlets and switches used to control the on/off state of an electrical circuit.

This invention has been described herein in considerable detail in order to comply with the patent statutes and to provide those skilled in the art with the information needed to apply the novel principles and to construct and use such specialized components as are required. However, it is to be understood that the invention can be carried out by specifically different equipment and devices, and that various modifications, both as to the equipment and operating procedures, can be accomplished without departing from the scope of the invention itself.

What is claimed is:

1. A decorative covering assembly for hiding an electric outlet plate on a room wall comprising:
    a base member having a convex front surface and a concave rear surface over their entire extent, said rear surface supporting a mounting bracket adapted to cooperate with a stud or screw of the electrical outlet plate for suspending the base member in covering relation with respect to the electrical outlet plate; and
    a cover member having an arcuate curvature over its entire extent conforming to the convex front surface of the base member.

2. The decorative covering assembly of claim 1 wherein the cover member comprises a transparent material.

3. The decorative covering assembly of claim 1 wherein the base member comprises an opaque material.

4. The decorative covering assembly of claim 2 and further including a decorative substrate disposed between the base member and the cover member.

5. The decorative covering assembly of claim 1 wherein both the base member and the cover member are generally rectangular in a plan view thereof.

6. The decorative covering assembly of claim 1 wherein the mounting bracket comprises a hollow protuberance of generally rectangular cross section with a longitudinally extending slot formed in a wall of the protuberance offset from the concave rear surface.

7. The decorative covering assembly as in claim 5 and further including a pair of clasps integrally formed on opposed side edges of one of the cover member and the base member and adapted to releasably connect to the other of the cover member and base member.

8. The decorative covering assembly of claim 7 wherein the clasps are on the cover member and the base member is notched along opposed side edges thereof to receive said clasps therein.

9. The decorative covering assembly of claim 1 wherein the electric outlet plate comprises a wall mounting switch plate for a telephone.

10. The decorative covering assembly as in claim 1 wherein the electric outlet plate comprises a switch plate for an electrical wall outlet.

11. The decorative covering assembly as in claim 4 wherein the decorative substrate comprises one of a photograph, a wallpaper pattern, an event calendar and a paper sheet with alphanumeric indicia thereon.

12. A decorative covering assembly for hiding an electrical outlet plate on a room wall comprising:
    (a) a generally rectangular base member having an arcuate cross section with a convex face, a concave rear surface and an inwardly offset border surrounding the convex face;
    (b) a generally rectangular, transparent, cover member having an arcuate curvature conforming to the convex face of the base member and inwardly projecting edges, the cover member being dimensioned such that the inwardly projecting edges fit into the inwardly offset border of the base member;
    (c) a mounting bracket projecting from the concave rear surface of the base member configured to receive an outwardly projecting stud on the electrical outlet plate; and
    (d) clasps on the cover member for releasably coupling the cover member to the base member.

13. The decorative covering assembly of claim 12 wherein the mounting bracket comprises a hollow protuberance of generally rectangular cross-section and having an open bottom and a planar wall generally parallel to and offset from the concave rear surface, the planar wall having a slot extending longitudinally from the open bottom.

14. The decorative covering assembly of claim 13 wherein the slot is adapted to fit about an existing screw or stud of an electrical outlet plate.

15. The decorative covering assembly of claim 12 and further including a flexible sheet bearing one of a graphic image and alphanumerics, the sheet being fitted between the base member and the cover member and visible through the transparent cover member.

16. The decorative covering assembly of claim 14 and further including a flexible sheet bearing one of a graphic image and alphanumerics, the sheet being fitted between the base member and the cover member and visible through the transparent cover member.

* * * * *